O. J. SALISBURY.
FILTER FRAME OR LEAF.
APPLICATION FILED MAR. 18, 1916. RENEWED AUG. 4, 1917.
1,249,835. Patented Dec. 11, 1917.
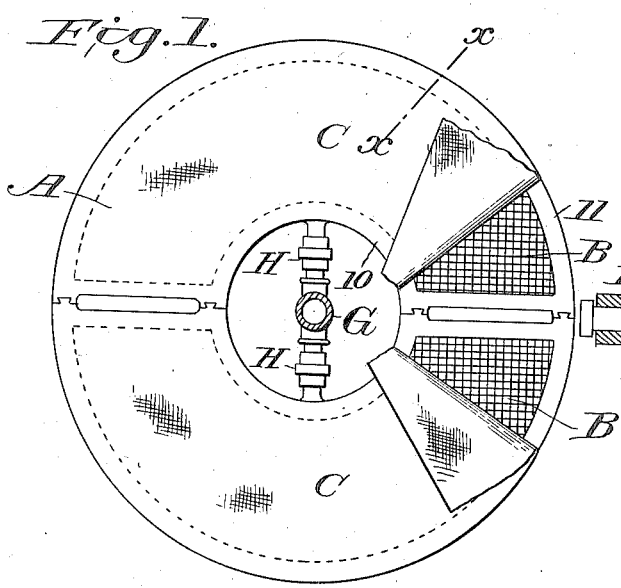
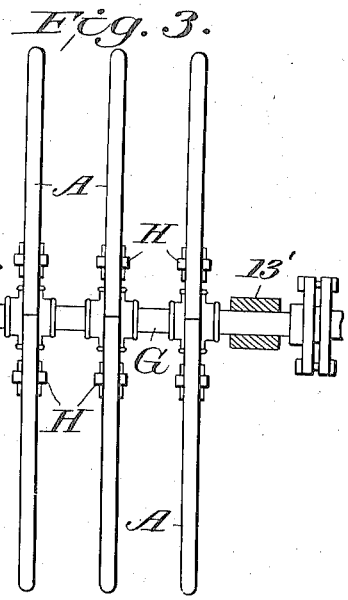
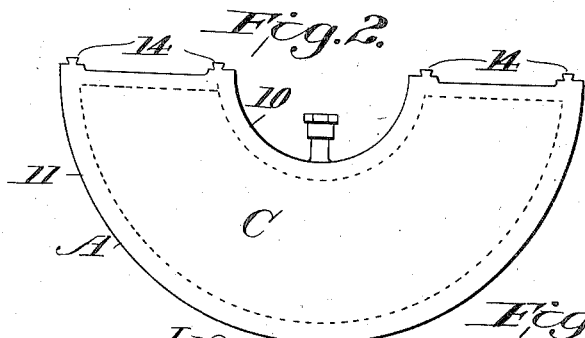
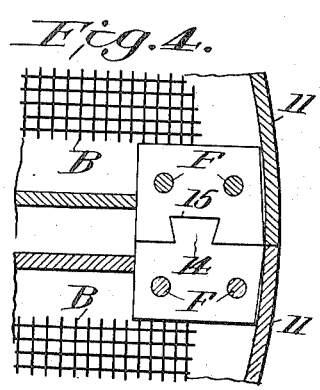
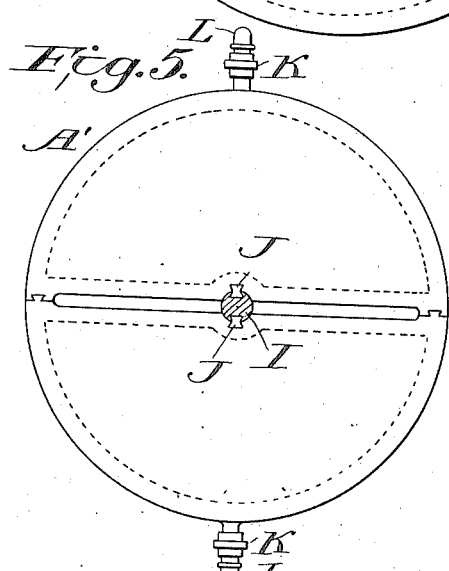
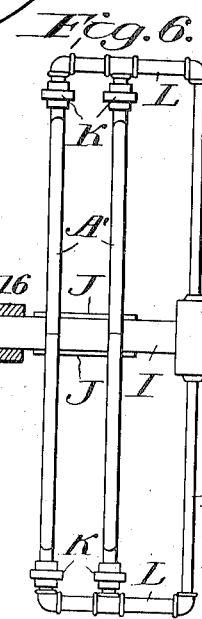
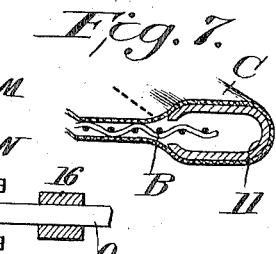
Inventor
Orange J. Salisbury
By T. Walter Fowler
Attorney

UNITED STATES PATENT OFFICE.

ORANGE J. SALISBURY, OF SALT LAKE CITY, UTAH.

FILTER FRAME OR LEAF.

1,249,835.  Specification of Letters Patent.  Patented Dec. 11, 1917.

Application filed March 18, 1916, Serial No. 85,177. Renewed August 4, 1917. Serial No. 184,532.

*To all whom it may concern:*

Be it known that I, ORANGE J. SALISBURY, a citizen of the United States, residing at Salt Lake City, in the county of Salt Lake and State of Utah, have invented certain new and useful Improvements in Filter Frames or Leaves, of which the following is a specification.

My invention relates to certain new and useful improvements in filters generally and particularly in the construction of the frame or leaf thereof which carries and supports the filtering sides of the fabric which is designed to separate the liquid from the solid constituents of the pulp or material to be filtered.

A leading object of the present invention is to so construct a filter frame or leaf that it may be readily disconnected and removed from association with other filtering units without causing any disturbance of the latter.

A further object of the invention is to make the filter frame or leaf of a sectional character to facilitate repairs and to simplify the removal of the leaf and the substitution of a new leaf.

With the above and other objects in view, my invention consists of the parts and the constructions, arrangements and combinations of parts which I will hereinafter describe and claim.

In the accompanying drawings forming part of this specification and in which similar reference characters indicate like parts in the several views;

Figure 1 is a side view with parts broken away, of a filtering unit, showing one embodiment of my invention.

Fig. 2 is a similar view of one of the sections of the filtering unit detached.

Fig. 3 illustrates an edge view of a plurality of spaced filtering units mounted on a common central support.

Fig. 4 is an enlarged section of the joint between the meeting edges of sections of the filtering unit.

Fig. 5 illustrates another form of filter leaf or unit embodying my invention.

Fig. 6 is an edge view of a plurality of filter leaves or units, similar to Fig. 5, connected to an external header.

Fig. 7 is an enlarged cross-section on the line X—X of Fig. 1.

In carrying out my invention I prefer to design the filter leaves or frames of a general circular form whereby they are adapted for use in any of the pressure, suction or other filters using or capable of using circular filtering frames or units.

The filter leaves or frames and by which term I will hereinafter refer to the filter units, are of disk-like form and they may be open or closed at the center, this depending upon whether the filtrate is to be delivered from the center or the circumference of the leaf or frame. In either case, however, the filter leaf or frame is, preferably, composed of a plurality of similar sections whose abutting edges are closed and designed to be interlocked or fastened one to the other, or secured in some other suitable manner to unite the sections in a rigid whole.

The filter leaf shown in Fig. 1, has its frame or leaf, A, composed of sections having closed abutting edges and inner and outer binding bands or strips, 10—11, respectively and a connecting woven wire or other foraminous support which forms a backing, B, for the outer flexible filtering sides, C, of the sections. These filtering sides, C, are of sheet-form and are usually made of fibrous material; they may represent any of the fabrics commonly used for filtering purposes, and which while permitting the separated liquid, or filtrate to pass to the interior of the section, will collect upon the outer surface in cake-form, the solid constituents of pulp or solution under treatment. The fabric filtering sides, C, may be secured to the interior support or backing, B, in any well known manner, as by lines of stitching extending through the fabrics and through the foramina or openings in the backing plate, and which backing plate may have its inner and outer edges extending into slots formed in the inner and outer binding strips or bands, 10—11, which are herein shown as in the form of flattened tubes, Fig. 7, which arrangement allows the filtered liquid to enter said tubes and from which it may be drawn or delivered to a point outside the frame. In the form of open-center frame, A, shown in Fig. 1, the filtered liquid may be conducted from the inner binding band, 10, into a centrally disposed discharge pipe, G, by means of an appropriate union, H, said pipe being similarly connected to and extending centrally of a series of filtering leaves or frames when spaced apart, as in Fig. 3, and forming a rigid support for the same, said tube being mounted in bearings, 13—13', whereby the pipe and attached filtering leaves or frames may be rotated.

As before stated, the filter frame or leaf is composed of similar sections. For present purposes two sections are employed and their closed abutting edges are formed with some appropriate means for fastening them together. The specific means shown but to which I do not limit myself, is a dovetailed rib or tongue, 14, one section fitting a corresponding groove or recess, 15, in the other section, which arrangement holds the sections rigidly together and yet will allow for a separation of the sections by a movement of one section relatively to the other section in a plane which is parallel to the axis of the filter leaf and which operation may be readily effected when the union, H, connecting the movable section to the central discharge pipe is uncoupled therefrom.

If desired and to aid in securing the sections of the filter leaf, suitable soft iron or other pins, F, may be passed transversely through the dove-tailed parts and through the flattened tubular binding bands, as shown in Fig. 4.

In the form of filter leaf or frame, A', shown in Figs. 5 and 6, the center of the same is closed except for an opening to admit the shaft, I, and which and the walls of the semi-circular openings in the meeting faces of the sections of the filter leaf or frame, are grooved to admit the dove-tailed keys, J, which detachably lock the sections to each other and to the shaft I, which latter may be mounted for rotation in bearings, 16.

In the form of filter leaf or frame shown in Figs. 5 and 6, there is a peripheral discharge of the filtered liquid which has passed to the interior of the leaf or frame and to this end, a union, K, connects the sections of the filter leaf or frame, or any number of the same placed side by side on the shaft, I, to an exterior header, L, which in turn connects by pipe, M, with a chamber, N, from whence leads a filtrate discharge tube, O.

From the foregoing it will be apparent that in either of the forms of filter leaves or frames shown each part or section thereof is a unit in itself; that is, each of the segments of the filter leaf or frame is fastened in such manner that it may be readily detached without disturbing the companion section.

It will be understood that my improved construction of filter leaf is designed for use in either suction or pressure filters where it is desirable to have a rotation of the filter leaf itself, either during filtration or when discharging the cake, or at any of the steps of the filtering cycle.

I am aware that circular filter leaves have heretofore been used in rotary filters, but the construction of the same has heretofore been such that the removal of the leaves and the substitution of new leaves for old or damaged ones was attended with great difficulty and at the expense of considerable time. In the case of my improved filter leaf, if it should become necessary to change the leaf or to repair or renew the filtering fabric the removal of the particular leaf or leaves is readily effected through the agency of the union, H, which connects the leaf to the central filtrate pipe of Fig. 1, or by unscrewing the union, k, which connects the leaf to the outside header, in the construction shown in Fig. 5, and then separating the sections by sliding one relatively to the other through the agency of the dove-tailed connections between the meeting edges of the sections. One leaf may, therefore, be removed without disturbing other leaves of the group with which the filter may be provided; or one section of a single leaf may be removed without disturbing the companion section of the same leaf. The number of sections employed for individual filter leaves is unimportant and while I show the leaves as composed of two similar sections I do not wish to be understood as limiting myself thereto.

Having thus described my invention what I claim as new and desire to secure by Letters Patent is:

1. A filter leaf or frame composed of sections each of which constitutes a filtering unit having its own filter medium and interior chamber for filtrate, and means for removably securing the sections to each other in substantially a common plane.

2. A filter leaf or frame composed of sections each of which includes a filtering medium and a foraminous backing therefor, said sections being closed at the edges and means for securing the sections to each other in a common plane to form a complete filter leaf or frame.

3. A sectional filter leaf or frame the sections whereof include spaced filtering sides and a filtrate chamber therebetween, said sections having meeting edges fashioned to interlock to unite the sections and form a complete filter leaf or frame.

4. A sectional filter leaf or frame the sections whereof are of segmental form and each includes a filter medium and a foraminous backing therefor, said sections abutting edgewise and the edges of the sections having co-acting tongue and groove agencies forming an interlock between the sections.

5. A filter leaf or frame formed of sections each including concentric binding bands and a connecting foraminous structure, and a filtering medium overlying said structure, and means for securing the sections edgewise to each other to form a filter leaf or frame of circular form.

6. A filter leaf or frame formed of a plurality of sections of segmental form and each including a filtering medium and a foraminous backing therefor, means for connecting the sections edgewise in a common plane to form a complete leaf or frame of circular outline, a header connecting with the interior of said sections, and detachable couplings between the header and the individual sections of the leaf or frame.

7. The combination with a header and means whereby it is rotatably mounted, of a filter leaf or frame formed of a plurality of sections each comprising a filtering agent and a foraminous backing therefor, and means for binding the edges of the sections, means independently detachably connecting the edges of one section to the corresponding edges of another section, and independent detachable couplings between the sections and the header permitting the removal of any section without disturbing the others.

8. A filter leaf or frame formed of a plurality of sections each of which constitutes a filter unit having a filtering surface, a filtrate chamber and a foraminous backing for said surface, each of said sections being closed at the inner, outer and abutting edges, means for detachably uniting the abutting edges of the sections to form a complete filter or frame, a header forming a common conduit for the filtrate of the several sections and detachable connections between each section and said header permitting a section to be removed without disturbing the other sections.

9. A filter leaf or frame formed of a plurality of sections each of which constitutes a filter unit having a filtering surface, a filtrate chamber and a foraminous backing for said surface, each of said sections being closed at the inner, outer and abutting edges, means for detachably uniting the abutting edges of the sections to form a complete filter or frame, a header forming a common conduit for the filtrate of the several sections and detachable connections between each section and said header permitting a section to be removed without disturbing the other sections, said header and filter leaf or frame being mounted for rotation in unison.

In testimony whereof I affix my signature.

ORANGE J. SALISBURY.